Feb. 3, 1953 W. H. FENGLER 2,627,165
TURBINE TYPE HYDRAULIC TORQUE CONVERTER
Filed Feb. 9, 1949 7 Sheets-Sheet 1
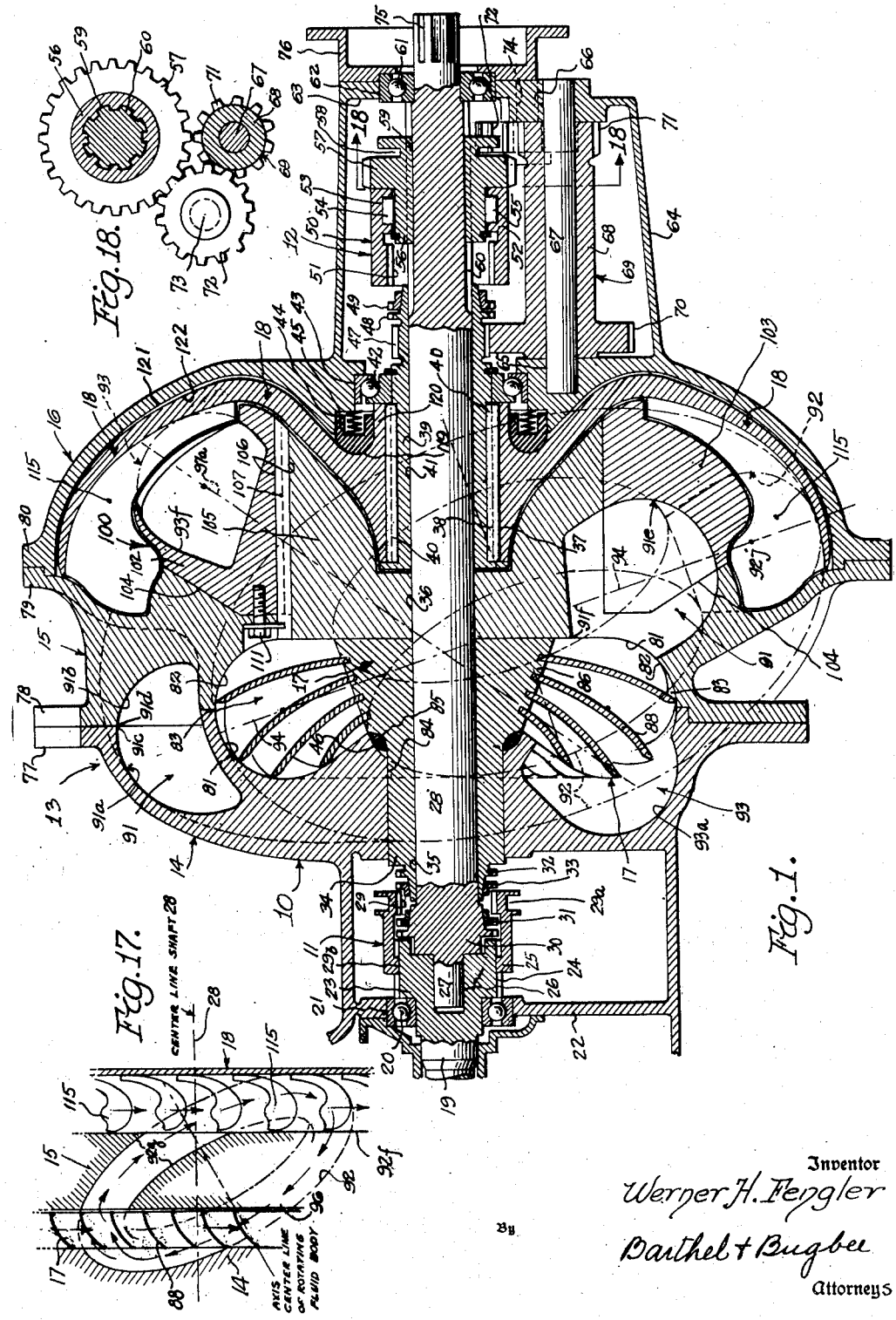
Inventor
Werner H. Fengler
By
Barthel + Bugbee
Attorneys

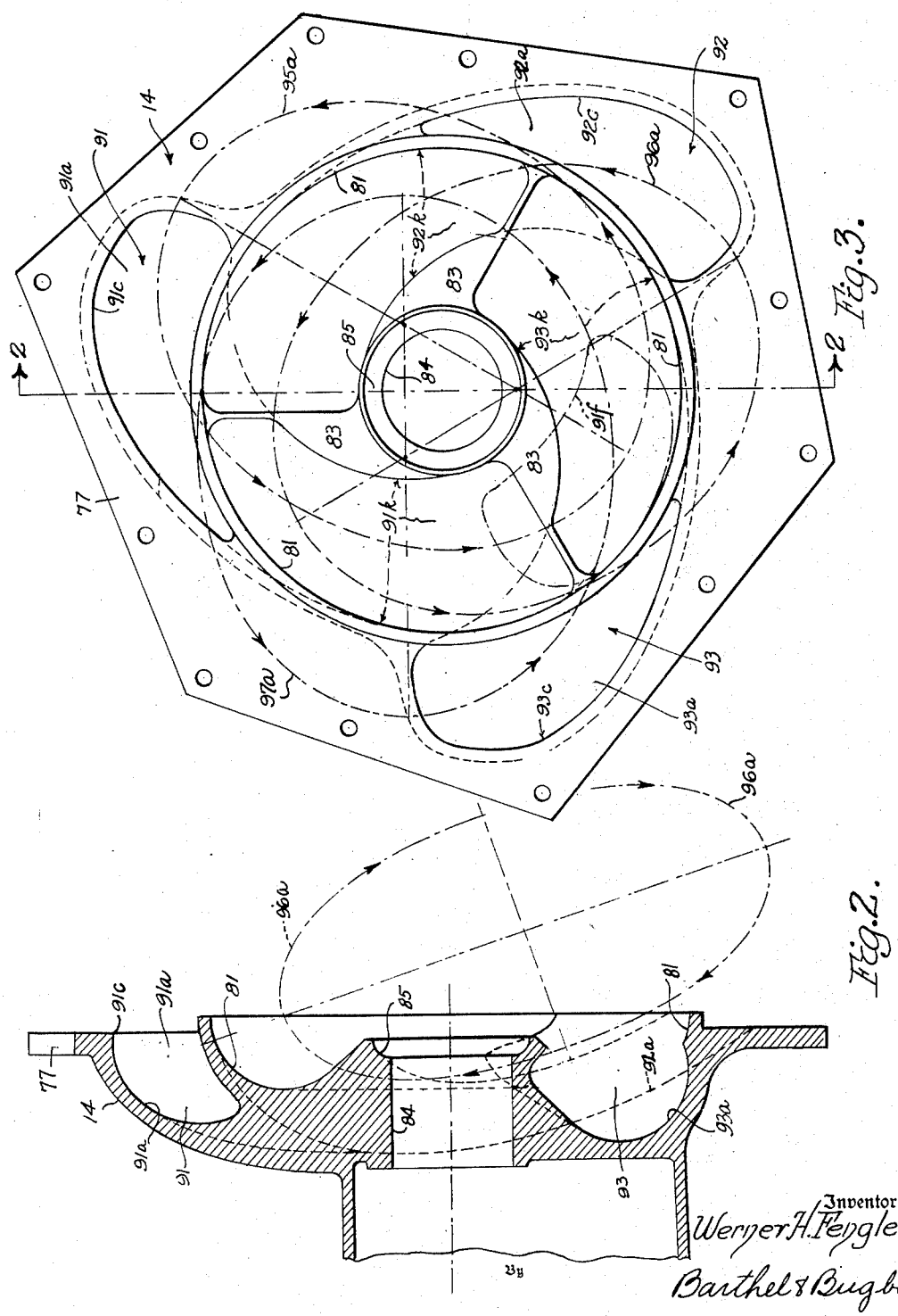

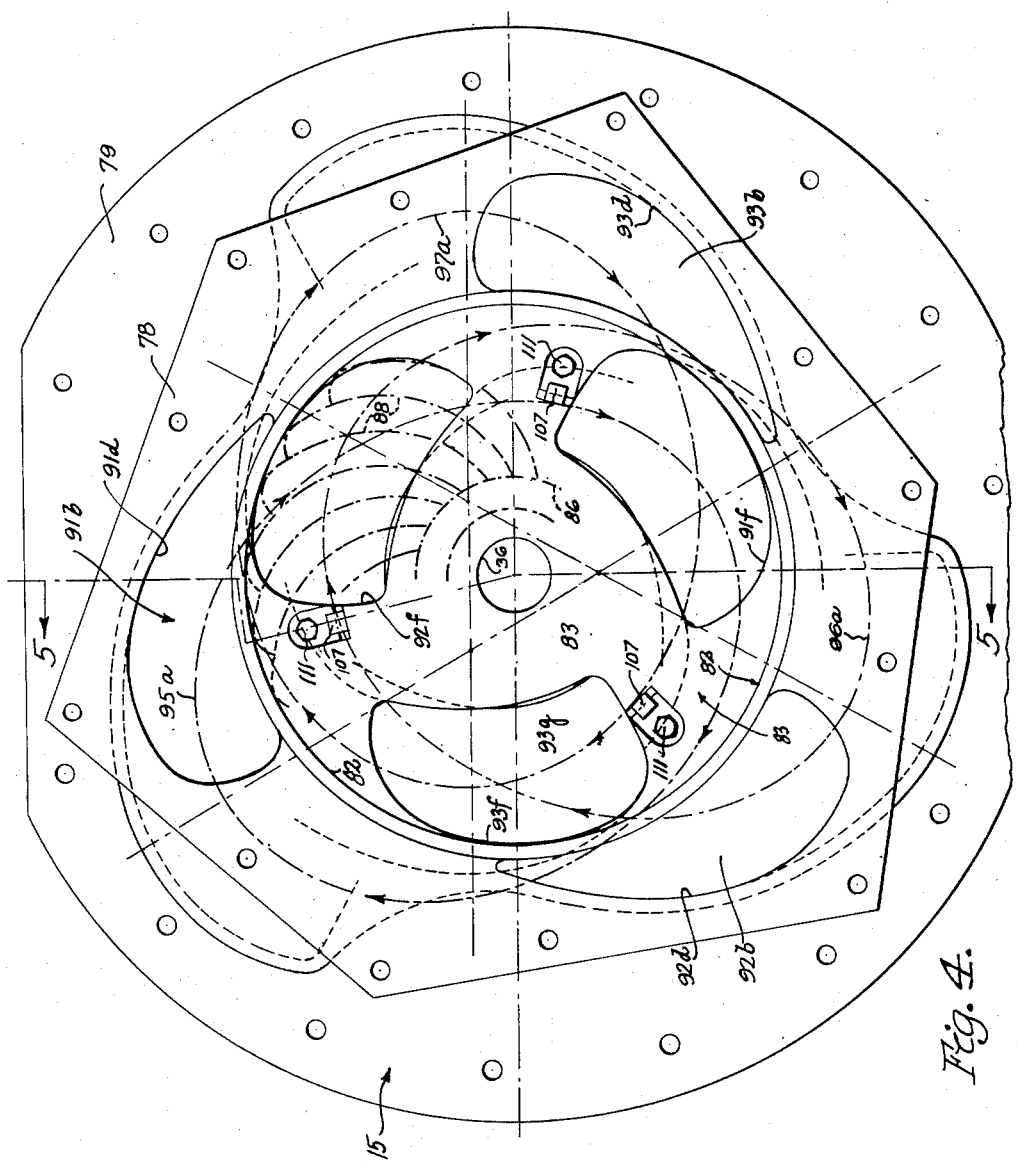

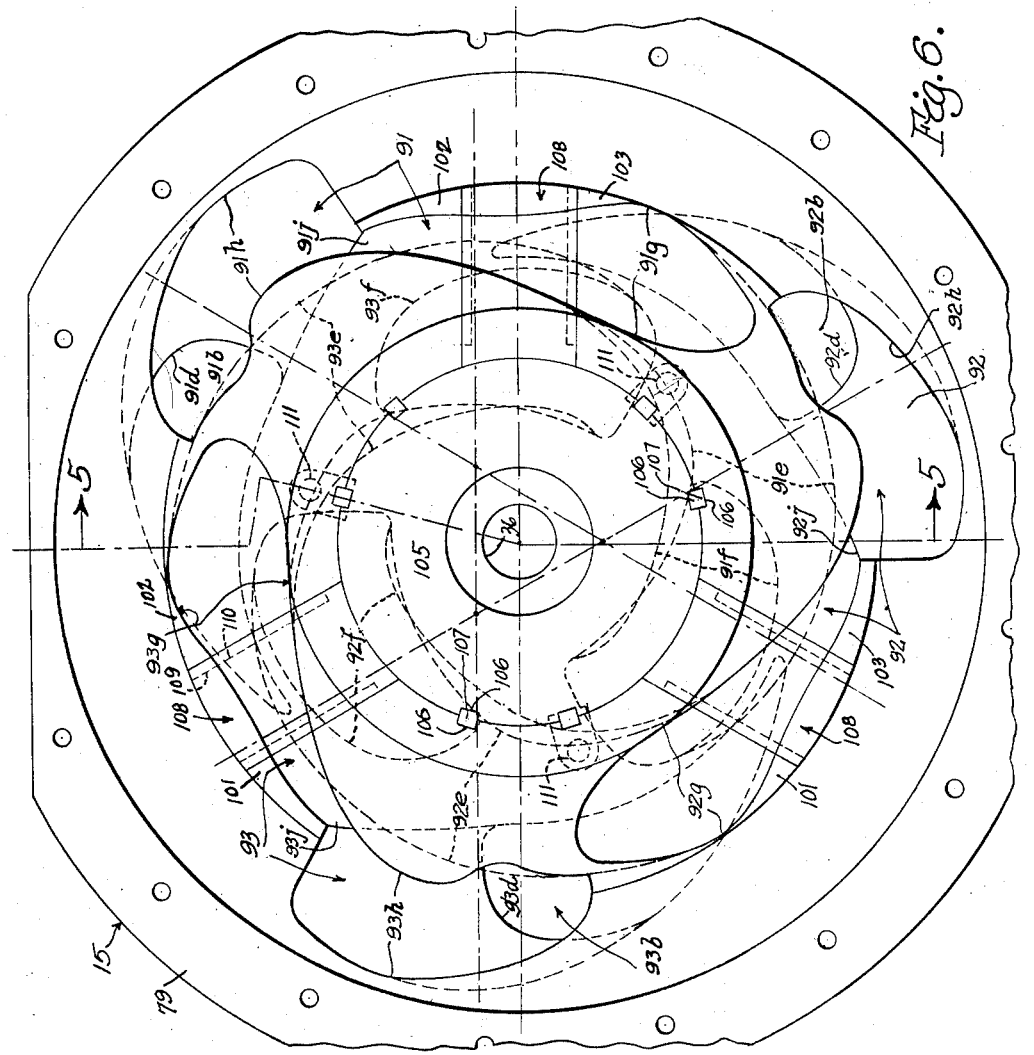

Feb. 3, 1953 W. H. FENGLER 2,627,165
TURBINE TYPE HYDRAULIC TORQUE CONVERTER
Filed Feb. 9, 1949 7 Sheets-Sheet 5
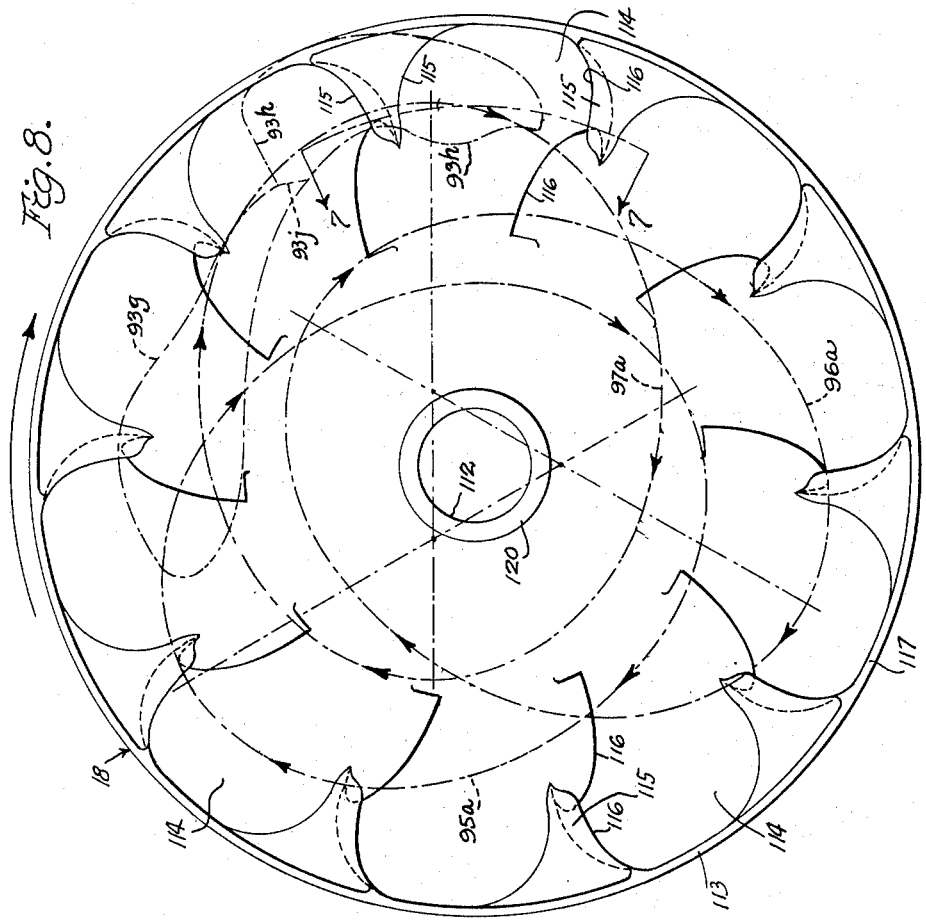
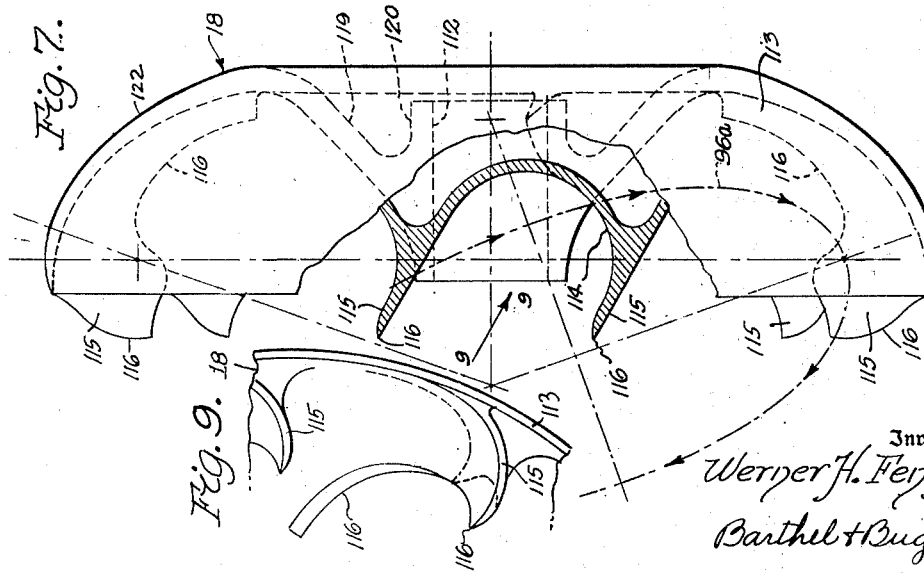
Inventor
Werner H. Fengler
Barthel & Bugbee
Attorneys

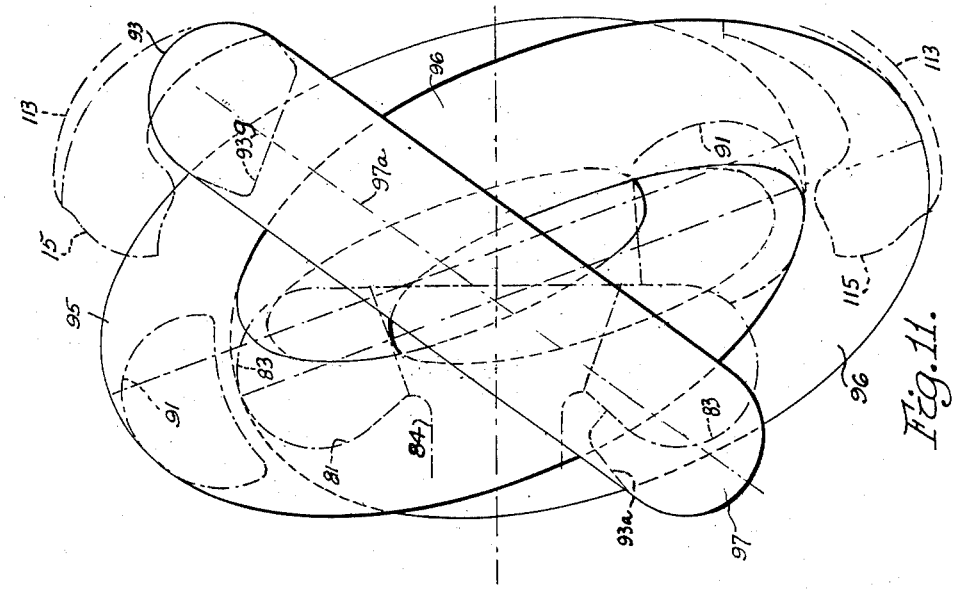

Feb. 3, 1953
W. H. FENGLER
2,627,165
TURBINE TYPE HYDRAULIC TORQUE CONVERTER
Filed Feb. 9, 1949
7 Sheets-Sheet 7
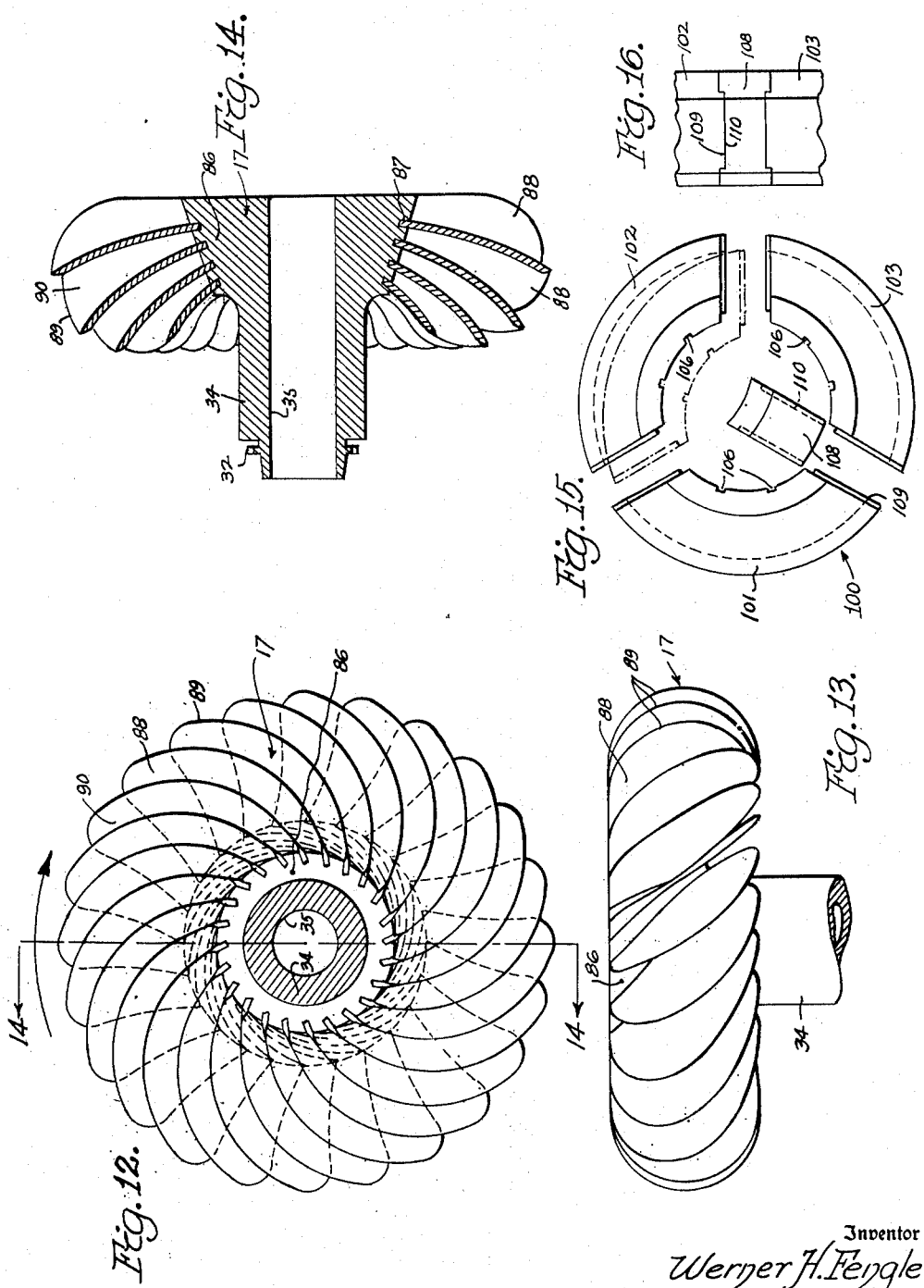
Inventor
Werner H. Fengler
Barthel + Bugbee
Attorneys Patented Feb. 3, 1953

2,627,165

UNITED STATES PATENT OFFICE 2,627,165

TURBINE TYPE HYDRAULIC TORQUE CONVERTER

Werner H. Fengler, Dearborn, Mich.

Application February 9, 1949, Serial No. 75,480

11 Claims. (Cl. 60—54)

This invention relates to power-transmitting devices and, in particular, to turbine type hydraulic torque converters.

One object of this invention is to provide a hydraulic torque converter wherein the liquid in the converter travels along one or more toroidal pathways between the impeller or driving wheel and the runner or driven wheel, the liquid flowing smoothly and rapidly along a gradually curving pathway without abrupt changes and with a minimum of vortex action and friction.

Another object is to provide a hydraulic torque converter wherein the power transmitting liquid flows in one or more toroidal paths which are tilted at skew angles to the axis of rotation of the impeller and runner, these toroidal paths being almost entirely separate from one another and substantially independent of one another so as to be substantially free from interference with one another during the operation of the torque converter.

Another object is to provide a hydraulic torque converter wherein the liquid entering and leaving the impeller and runner is guided in one or more toroidal paths by guide channels or nozzles in a guide structure interposed between the impeller and runner so as to insure the smooth flow of the liquid with a minimum of vortex action or interference between different toroidal paths of liquid, the rapidly flowing toroidal bodies of liquid exerting a flywheel action as they rotate around the axis of rotation.

Another object is to provide a hydraulic torque converter of the foregoing character, wherein the impeller and runner are of different diameters so as to give a power and speed ratio between them, the runner being preferably of larger diameter than the impeller in order to effect a speed reduction between them and thus eliminate the necessity for additional reduction gearing which might otherwise be required.

Another object is to provide a hydraulic torque converter of the foregoing character wherein the impeller and runner are provided with vanes or blades formed in such a manner that the compartments or recesses between the blades always enclose a complete portion of the toroidal pathway of the liquid, the blades and the guide channels or nozzles in the guide structure being so arranged that each blade or vane will not uncover the exit opening until the next blade is in a position to take the full thrust.

Another object is to provide a hydraulic torque converter of the foregoing character wherein the toroidal bodies of liquid are slightly constricted or throttled at certain portions of their paths so as to impart a nozzle action and increased speed to the liquid, as well as to impart an increased proportion of torque to the output shaft of the converter—a desirable condition to achieve where the converter is to be used for vehicle driving purposes.

Another object is to provide a hydraulic torque converter wherein the fluid travels in a plurality of substantially independent toroidal paths between the impeller and runner, and is returned from the runner to the vanes or blades of the impeller at an angle rather than to the axial region of the impeller, as in prior types of converters, the impeller vanes cutting through the toroidal bodies of flowing liquid at an angle so as to accelerate the liquid without changing its direction of flow.

In the drawings:

Figure 1 is a vertical longitudinal section through a hydraulic torque converter according to a preferred form of the present invention, with the parts in their neutral positions;

Figure 2 is a central vertical section through the impeller casing portion, taken along the line 2—2 in Figure 3.

Figure 3 is a rear elevation of the impeller portion of the torque converter casing, looking toward the forward end of the converter;

Figure 4 is a front elevation of the guide ring or nozzle structure shown in Figures 6 and 5, looking toward the rearward end of the converter;

Figure 5 is a left-hand side elevation, partly in central vertical section, of the guide ring or nozzle structure shown in Figure 2, taken along the line 5—5 in Figures 6 and 4;

Figure 6 is a rear elevation of the guide ring or nozzle structure employed in the torque converter of Figure 1, looking toward the forward end thereof;

Figure 7 is a left-hand side elevation of the runner or driven wheel shown in Figure 8; partly in section along the line 7—7 therein;

Figure 8 is a front elevation of the runner or driven wheel looking toward the rearward end of the converter;

Figure 9 is a fragmentary front elevation of the driven wheel or runner of Figure 8 showing a portion of the vane or bucket structure, looking in the direction indicated by the arrow 9—9 in Figure 7;

Figure 10 is a diagrammatic rear elevation, looking toward the forward end of the converter, of the three toroidal bodies of flowing liquid resulting from the action of the torque converter of the present invention, as shown in Figures 1 to 9 inclusive, with the liquid considered as if instantaneously frozen or solidified for purposes of illustration;

Figure 11 is a left-hand side elevation of the toroidal liquid bodies shown in Figure 10;

Figure 12 is a front elevation of the driving wheel or impeller of the torque converter shown in Figure 1, looking toward the rearward end of the converter, with the impeller hub in cross-section;

Figure 13 is a top plan view of the impeller shown in Figure 12;

Figure 14 is a central vertical section through the impeller taken along the line 14—14 in Figure 12;

Figure 15 is an exploded front elevation of the segment portions of the guide ring or nozzle structure, showing one of the filler blocks withdrawn from its position to permit disassembly of the structure and consequent removal of the runner or driven wheel;

Figure 16 is a fragmentary side elevation of a portion of the construction shown in Figure 15, with a filler block in position;

Figure 17 is a diagrammatic view showing the principle of operation of the converter with the impeller and runner shown in developed or rectilinear form for convenience of demonstration; and Figure 18 is a cross-section along the line 18—18 in Figure 1, showing the reverse gearing by which the torque converter is made to drive the output shaft in a reverse direction, such as for backward travel of a vehicle.

General arrangement

The hydraulic torque converter as hitherto known has been frequently employed for bringing a vehicle or other machine from a standstill up to a desired running speed. Such prior torque converters have generally been of the so-called Föttinger type wherein the runner and impeller roughly resemble the halves of a grapefruit facing one another, usually with a guide wheel between them. The liquid in such a torque converter generally pursues a complicated spiral path in an annular direction, much resembling a spiral spring which has been bent into a ring with its opposite ends in contact. In such prior torque converters, the liquid, during operation, is required to make many abrupt changes of direction with a consequently high amount of friction accompanied by the generation of considerable heat. This heat not only causes a serious loss of power and efficiency, but also results in the necessity for providing additional cooling arrangements for dissipating this heat. The complicated annular spiral path followed by the liquid in prior torque converters also results in the development of a great amount of vortex action with a further loss of efficiency and power and an additional generation of heat. In such prior torque converters, the liquid is thrown outward from the peripheral portion of the impeller or driving wheel into the peripheral portion of the runner or driven wheel whence it is returned by the vanes or blades thereof to the axial portion of the blades or vanes of the impeller or driving wheel. The driving wheel always functions on the principle of a centrifugal pump.

In the torque converter of the present invention, however, unlike prior torque converters, the driving wheel functions on the principle of a ship's screw propeller, pushing the liquid rearward and causing the liquid to flow in one or more toroidal paths encircling the axis of rotation and arranged at skew angles or planes thereto. These toroidal bodies of liquid are shaped much like a doughnut or the inner tube of a tire, and are intersected by the blades or vanes of the impeller or driving wheel at one side and by the blades or vanes of the runner or driven wheel on the other side, a guide ring or nozzle structure being arranged between them so as to cause the liquid to gradually change its direction and preserve its toroidal direction of flow in passing from the impeller to the runner and from the runner back to the impeller. By thus avoiding abrupt changes of direction, in the flow of the liquid, vortex action is greatly reduced and friction and heat kept at a minimum. In the present torque converter also, the impeller and runner may be made of different diameters so as to give a speed change between them so that a larger runner will effect a speed reduction and an increased torque over that imparted by the impeller.

General construction

Referring to the drawings in detail, Figure 1 shows, in central vertical section, a hydraulic torque converter, generally designated 10, according to a preferred form of the invention, as consisting generally of certain sub-assemblies of units such as input and output clutches 11 and 12 respectively, a casing 13 divided into an impeller casing portion 14, a reactor in the form of a guide ring or nozzle structure casing portion 15 and a runner casing portion 16. These casing portions contain a primary rotor termed an impeller or driving wheel 17 and a secondary rotor termed a runner or driven wheel 18. Power is transmitted to the power input clutch 11 from the engine shaft 19 connected to any suitable type of prime mover, such as a gasoline or diesel engine or turbine. The rearward end of the engine shaft 19 is rotatably supported in an anti-friction bearing 20, the outer race of which is mounted in an annular bore 21 in the forward casing extension 22.

The shaft 19 is provided with an enlarged portion 23 which is splined as at 24 to slidably receive a toothed annular clutch member 25. The enlarged shaft portion 23 is also provided with an axial bore 26 in which the reduced diameter forward end portion 27 of the torque converter main shaft 28 is rotatably mounted. For simplicity of illustration, and to avoid unnecessary complexity, the shaft portion 27 is shown as supported in a plain bearing. In actual practice, however, anti-friction bearings, such as needle bearings, would preferably be employed. This same bearing situation is also present in other parts of the torque converter 10, such as in the mounting of the runner 18 upon the shaft 28. The internal teeth 29 of the input clutch member 25 are shown in their neutral position in Figure 1, but are slidable to the left into engagement with a gear-like toothed clutch member 30 and a toothed synchronizing ring 31 mounted on the shaft 28, or to the right into mesh with a gear-like clutch member 32 and toothed synchronizing ring 33 mounted upon the hub 34 of the impeller or driving wheel 17 (Figures 1 and 14).

The clutch member 25 is provided with an annular external groove 29a which is adapted to be engaged by a conventional clutch-shifting yoke (not shown) of the usual approximately Y-shaped form connected to a conventional shaft and control mechanism such as a lever for shifting the clutch member 11 to and fro. Such clutch yokes and control mechanisms are well-known and their details form no part of the present invention.

The toothed clutch members 30 and 32 and their synchronizing rings 31 and 33 are mounted upon tapered portions of the main shaft 28 and impeller hub 34 respectively. The hub 34 of the impeller 17 is provided with an axial bore 35 through which the shaft 28 passes, anti-friction bearings (not shown) being preferably provided therebetween. The guide ring or nozzle structure 15 is likewise provided at its central portion with a bore 36 for the passage of the shaft 28 (Figure 1) which is likewise preferably provided with anti-friction bearings, such as needle bearings. The runner or driven wheel 18 is provided with a hub 37 which is bored as at 38 to receive a sleeve 39 to which it is drivingly connected as by a spline 40. The sleeve 39 is also preferably mounted in anti-friction bearings on the main shaft 28, the sleeve 39 containing a bore 41 for the passage of the shaft 28. The sleeve 39 is provided with an anti-friction thrust bearing 42, the outer race of which is mounted in a bore 43 in the runner casing portion 16. An annular cavity 44 is also provided in the runner casing portion 16 for a spring-pressed annular sealing member 45 designed to prevent leakage of oil or other liquid from the casing portion 16. A similar annular sealing member 46 is shown in Figure 1 as encircling the impeller hub 34 to prevent leakage of liquid from the forward end of the casing. The specific construction of the impeller and runner casing portions 14 and 16, guide wheel 15 and impeller and runner 17 and 18 is described subsequently below.

*Reverse gearing construction*

The sleeve 39 near its rearward end is provided with a pinion 47 (Figure 1) either integral with the sleeve 39 as shown or drivingly secured thereto. Beyond the pinion 47, the rearward end of the sleeve 39 is provided with a gear-like toothed clutch member 48 and adjacent it is a toothed synchronizing ring 49 similar to the synchronizing rings 31 and 32 and similarly mounted on a tapered portion of the sleeve 39. The members 48 and 49 are selectively engageable with a shiftable clutch member 50 forming a part of the output clutch 12 and provided with an internal gear portion or toothed portion 51 adapted to mesh with the toothed clutch member 48 and synchronizing ring 49 when the clutch member 50 is slid to the left. The clutch member 50 includes a rotatable collar 52 containing the internal toothed portion 51 (Figure 1) and also is internally recessed as at 53 to receive the rollers 54 of a conventional free-wheeling or overrunning clutch 55 which permits driving engagement between the collar 52 and the main shaft 28 in one direction of rotation only, and disengages when driven in the opposite direction or when one portion of the clutch 12 overruns the other. Such overrunning clutches 55 are conventional and their details form no part of the present invention.

The overrunning clutch rollers 54 rotate around the outside of the hub or sliding sleeve 56 of an external gear portion 57 forming the inner member of the overrunning clutch 55. Beyond the gear 57, the sleeve 56 is provided with an annular groove 58 adapted to receive a conventional clutch shifting yoke (not shown) of approximately Y-shaped form and connected to any suitable shaft and lever for control purposes. Such shifting yokes are also conventional and well-known and their details likewise form no part of the present invention.

The hub or sliding sleeve 56 is splined as at 59 (Figure 18) to drivingly and slidably engage the correspondingly splined portion 60 on the main shaft 28. Beyond the splined portion 60, the shaft 28 is journaled in an anti-friction bearing 61, the outer race of which is mounted in a bore 62 in the end wall 63 of the runner casing extension 64 (Figure 1). The latter projects outward and rearward from the runner casing portion 16, and the former and the latter are provided with aligned bores 65 and 66 respectively in which a shaft 67 is mounted.

Rotatably mounted on the shaft 67 is the hub 68 of a double gear 69 having a gear 70 on its forward end meshing with the pinion 47. The double gear 69 also has a pinion 71 on its rearward end either integral therewith as shown or drivingly secured thereto. The pinion 71 meshes with an idler gear 72 mounted on a jack shaft or stud 73 which, in turn, is seated in a bore 74 in the casing extension end wall 63 (Figures 1 and 18). The idler gear 72, in turn, meshes with the gear portion 57 of the shiftable clutch member 50 when the latter is slid in a rearward direction. The rearward end of the main shaft 28 is provided with a suitable splined portion 75 by which it is connected to a conventional universal joint or other coupling connection to the propeller shaft of the vehicle. If a universal joint is used, it is housed in a suitable casing, one of the halves of which is shown at 76 (Figure 1).

*Casing and rotor construction*

As previously stated, the casing 13 is divided into three main portions, namely an impeller casing portion 14, a guide wheel or nozzle structure 15, and a runner casing portion 16, the former and the latter containing an impeller or driving wheel 17 and a runner or driven wheel 18. The casing portions 14, 15 and 16 are provided with mating abutting flanges 77 and 78, also 79 and 80 (Figure 1) which are drilled to receive bolts by which they are bolted together. The casing portion 14 is centrally provided with a circular dished recess 81 having a toroidal peripheral portion partly made up of the opposed circular dished recess 82 in the nozzle structure casing portion 15 (Figure 1). The two recesses 81 and 82 unite and co-operate to form the impeller chamber 83 in which the impeller 17 is rotatably mounted, having an axial bore 84 which receives the hub 34 of the impeller 17. The location at which the bore 84 opens into the impeller chamber 83 is occupied by an annular groove 85 in which the previously described annular sealing member 46 is mounted.

The impeller 17 has a frusto-conical extension 86 (Figures 1 and 14) having spirally directed grooves 87 in which spirally directed vanes or blades 88 are securely mounted, as by welding. The vanes 88 have arcuate outer ends 89 closely approaching the correspondingly-shaped toroidal peripheral surface of the impeller chamber 83. The impeller 17 thus has obliquely-directed blades or vanes 88 and consequently the motive fluid, such as oil, must be directed into and out of the spaces 90 between the blades 88 in an oblique direction.

In order to do this, the casing 15 is provided with a plurality of approximately toroidal fluid passageways, three being shown and generally designated 91, 92 and 93 (Figures 1, 5 and 6). The fluid passageways 91, 92 and 93, however, lie partly in each of the casing portions 14 and 15. They roughly possess the shape of an inflated automobile inner tube, the principal plane of which is tilted at an oblique angle to the drive shaft 28 of the impeller 17. By principal plane is meant the plane containing the maximum diameters of the inner peripheral surface of the passageway 91, 92 or 93, such as, for example, the principal plane 94 indicated by the oblique chain line in Figure 1.

The shapes of the approximately toroidal or ring-like bodies of liquid occupying the chambers 91, 92 and 93 are shown at 95, 96 and 97 respectively in Figures 10 and 11. Thus, the liquid bodies, assumed for the purposes of simplification to have been removed from the casing 13 and instantaneously frozen in the positions they occupied in the chambers 91, 92 and 93 resemble three intertwined rings. Due to the limitations of two dimensional drawings, it is difficult to show these three dimensional intertwined rings 95, 96 and 97 except by a three-dimensional model. For the same reasons and due to the fact that the chambers 91, 92 and 93 are tilted relatively to the axis of the shaft 28, it is likewise difficult to show them in a two-dimensional drawing. Consequently, the drawings have been arranged to show the various casing portions in Figures 2 to 7 inclusive, with the parts of the chambers 91, 92 and 93 occupying each casing portion 14 and 15 and the various portions of each chamber 91, 92 or 93 designated by the reference numerals 91a, 91b, 91c, etc. Thus, for example, the chamber 91 has its upper cavity portion 91a (Figures 1 and 2) in the casing portion 14 and its upper cavity portion 91b in the casing portion 15. The cavity portion 91a at its junction with the cavity portion 91b has an outline aperture 91c (Figure 3), the cavity portion 91b having an outline aperture 91d. The passageway 91 in Figure 1 passes downward and forward in front of the shaft 28 and enters the blades of the impeller 17 from the front casing portion 14 through an aperture 91k (Figure 3) and after passing through the impeller 17 itself emerges through the aperture 91f (Figures 5 and 6) into a chamber portion 91e which is wholly within the middle casing portion 15. The passageway 91 continues in its ring-shaped path (Figure 1) upward behind the shaft 28, emerging through the aperture 91g (Figure 6) which is on the right-hand or rearward surface of the nozzle structure or middle casing portion 15. At the aperture 91g, the body of fluid intersects the buckets on the runner or driven wheel 18 as explained below. After leaving the buckets of the runner 18, the body of fluid 95 and the passageway 91 continues upward and passes through the aperture 91h (Figure 6) in the same surface of the middle casing portion 15 and passes back to the cavity 91b and apertures 91d and 91c in the cavity 91a, completing the circuit.

Figures 2, 3, 4 and 5 show in elliptical dotted lines the direction of flow of the motive fluid, such as oil, substantially at the center of the rotating liquid body 95, 96 or 97, as the case may be. The ellipse for the liquid body 95 in the chamber 91 is designated 95a. Similarly, the center line of the body of fluid 96 traversing the chamber 92 is designated 96a, and the centerline of the body of fluid 97 traversing the chamber 93 is designated 97a (Figures 3 and 4). In Figures 2 and 5, only the elliptical center line 96a for the body of liquid 96 traversing the chamber 92 is shown. From a comparison of Figures 2, 3 and 4 is will be seen that the various ellipses 95a, 96a and 97a can be lined up by means of a ruler so that they project across from one figure to the other so that the different ellipses can be co-related in the different views. These ellipses are oval, of course, only because their planes are tilted or make compound angles with the axis of the shaft 28; otherwise, in actuality, they are circular.

The chamber 92 is also approximately toroidal and is of similar configuration and has a similar course, except that it traverses a path which is rotated 120 degrees from the path of the chamber 91. The cavity 92a corresponds to the cavity 91a in the left-hand impeller casing portion 14, and mates with a corresponding cavity 92b in the middle casing portion 15, these cavities meeting at the outline apertures 92c and 92d respectively (Figures 3 and 6). The passageway 92 passes through the front casing portion 14 and enters the blades of the impeller 17 through an aperture 92k (Figure 3) and, after passing through the impeller 17 itself, it leaves through the aperture 92f (Figures 1, 5 and 6) in a portion 92e which is wholly within the middle casing portion 15. The passageway 92 continues in its ring-shaped path within the middle casing portion 15 and emerges through an aperture 92g whence it intersects the buckets of the runner 18. The passageway 92 then re-enters the middle casing portion 15 through the aperture 92h, emerges through the aperture 92d and re-enters the forward casing portion 14 through the aperture 92c. It then passes behind the impeller 17 and re-enters the impeller chamber 83, completing the circuit.

The toroidal fluid chamber 93 which carries the liquid body 97 also traverses a path which is rotated 120 degrees from the paths of the chambers 91 and 92. The cavity 93a (Figures 1 and 2) is located in the left-hand impeller casing portion 14. At this location, the chamber 93 enters the impeller chamber 83 through an aperture 93k (Figure 3) and the liquid passes through the spaces 90 between the vanes or blades 88. From the impeller chamber 83 in the forward casing portion 14, the passageway 93 passes upward behind the shaft 28 and enters the middle casing portion 15 through the aperture 93f (Figure 4). The passageway 93 continues upward within the casing portion 15 and emerges through the aperture 93g, whence it intersects the buckets on the runner or driven wheel 18. After leaving the buckets of the runner 18, the passageway 93 re-enters the middle casing portion 15 through the aperture 93h and emerges on the opposite side through the aperture 93d and enters the forward casing portion 14 through the aperture 93c. It thence re-enters the forward casing portion 14 behind the impeller 17, and re-enters the impeller chamber 83, completing the circuit.

Thus, it will be seen that the casing portions 14 and 15 provide passageways which cooperate with the impeller chamber 83, the impeller 17 and the runner 18 to provide a complete circuit for each of the toroidal bodies of rotating fluid 95, 96 and 97 traversing the toroidal passageways or chambers 91, 92 and 93. These passageways pass by one another substantially without interference, except at the locations where they emerge to engage the runner buckets. At these locations designated 95b, 96b and 97b (Figure 10), the body of liquid is constricted, this reduction in cross-sectional area resulting in a nozzle effect. The constricted portion 92j, for example, is shown at the bottom of Figures 1 and 6. The constricted portion 92j is indicated at the bottom of Figure 10 by double lead lines extending from the reference numeral 95b to opposite sides of the constricted portion. It is at this portion that the impeller buckets or blades cut into the body of liquid 96. Similarly, the chambers 91 and 93 have constricted portions 91j and 93j respectively (Figure 6) at the locations where they intersect the buckets of the impeller 18. Figure 17 shows diagrammatically the circuit relationships of the impeller 17 and runner 18 with respect to one of the toroidal chambers, such as the chamber 92 traversed by the body of fluid 96.

In order to permit assembly of the middle casing portion 15, the portion 100 thereof is formed in three pieces 101, 102 and 103 (Figures 1 and 15) which are fitted into a cutaway recess 104 surrounding the central portion 105 of the casing portion 15 (Figure 1). The portions 101, 102 and 103 are provided with keyways 106 which mate with keys or splines 107 on the central portion 105. The portions 101, 102 and 103 in assembly are incomplete, being separated by gaps which are filled by filler blocks 108 (Figure 15) which are fitted in by the tongue and groove construction 109 and 110. The parts 101, 102 and 103 are held in assembly by the bolts 111 (Figure 1). These inserts 101, 102 and 103 occur at the locations where the buckets of the runner 18 adjoin the central casing portion 15.

Runner assembly

The runner 18 (Figures 7, 8 and 9) is a shallow bowl-shaped member with a central bore 38 by which it fits tightly through the splines 40 onto the sleeve 39. The runner 18 consists of a shell 113 in which are formed bucket cavities 114. These are inclined at an angle to a plane perpendicular to the axis of rotation, as indicated by the arrow 9—9 in Figure 7, and by the cross-hatch portion in the central part of Figure 7. The bucket cavities 114 are provided with partition walls 115 on opposite sides of the cavities 114. The partition walls 115 have knife-like edges 116 which serve to divide the fluid flowing against them from the nozzle apertures in the middle casing portion 15. The rim 117 unites the various walls 115 with one another, the walls 15 in effect forming blades or vanes. Figure 8 shows in dotted lines at the upper right-hand portion thereof one of the nozzle openings 93e and one of the outlet openings 93f through which the liquid body 97 enters and leaves the impeller buckets 114. The rearward surface of the runner 18 is provided with an annular recess 119 surrounding the rearward part 120 of the hub 37 through which the bore 38 passes. The rearward or right-hand casing portion 16 is dished as at 121 (Figure 1) to follow the varying configuration of the rearward surface 122 of the runner 18. The clearances between the runner 18 and the adjacent portions of the casing 15 are shown as greatly exaggerated in Figure 1 for the purpose of clarity and ease of understanding, but actually they are kept at a minimum so as to reduce leakage and bypassing to a minimum.

Operation

In considering the operation of the hydraulic torque converter of this invention, it should again be recalled that the impeller 17 acts much in the manner of a ship's propeller in moving the three ring-shaped or toroidal bodies of fluid 95, 96 and 97 which occupy the passageways 91, 92 and 93 respectively in the casing portions 14 and 15. Again let it be remembered that these three ring-shaped bodies of fluid 95, 96 and 97 (Figures 10 and 11), and of course the passageways 91, 92 and 93 which they traverse, have their median planes (the plane containing the maximum radii or diameters in each case) inclined at skew or compound angles to the axis of rotation of the shaft 28. These three passageways enter and traverse the respective casing portions 14 and 15 and engage the impeller 17 and runner 18 at locations 120 degrees apart so that they can pass through these elements without conflicting with one another.

Let it also be assumed that the various passageways and cavities within the casing portions 14, 15 and 16 of the casing 13 are filled with a suitable motive liquid, such as a conventional oil used for hydraulic transmissions. The three fluid passageways 91, 92 and 93 are, of course, completely independent of one another and are not interconnected except at the impeller chamber 83 and the runner chamber 121. These chambers are filled with oil which separates into three portions 95, 96 and 97 traversing the three fluid passageways 91, 92 and 93 respectively. A certain amount of oil is, of course, carried around by the vanes of the impeller 17 or by the buckets of the runner 18, or leaks through the clearances between these rotors and their respective casing walls, thus equalizing the distribution of liquid in the three sets of passageways.

Finally, let it be assumed that the impeller 17 is being rotated by the engine shaft 19 in a clockwise direction (Figures 1, 4 and 8) as indicated by the arrows in the elliptical paths shown therein. The directions of the arrows in Figures 3 and 10, of course, are counterclockwise since these views are taken looking from the rearward side of the apparatus toward the front, that is, from the rear axle side looking toward the engine. Figure 17, of course, shows a fanciful arrangement wherein the impeller 17 and runner 18 are shown as laid out in straight lines.

Assuming the engine shaft 19 (Figure 1) to be rotating in a clockwise direction, and assuming the input clutch 11 to be shifted to the right to interconnect the internal teeth 29 with the external teeth 32 and 33, the driving torque from the shaft 19 will be transmitted through the splines 24, 29b, the input clutch 11 and the teeth 29, 33, 32 to the impeller 17 journalled upon the shaft 28, rotating the impeller 17 in a clockwise direction.

Since the motion of the fluid bodies 95, 96 and 97 takes place in planes which are at skew angles to the plane of the paper of the various drawings, and since the drawing only shows two dimensions, it is, of course, impossible to show in a drawing the entire pathway of the fluid, other than in a skew cross-section plane which would again present the difficulty of relation this skew cross-section plane to the normal planes occupied by the remainder of the drawings. Thus, of necessity, only a few portions of the three passageways 91, 92 and 93 traversed by the annular or toroidal fluid bodies 95, 96 and 97 appear in any one of the drawing figures. The passageway 93, traversed by the fluid body 97, shows up most helpfully in this respect since its intersection with the impeller vanes or blades and runner buckets happens to coincide very nearly with the vertical plane shown in Figure 1, hence the operation will first be described as to this passageway 93 and fluid body 97.

As the impeller 17 rotates, its angled or spirally directed blades 88 create a suction to the left of them in the lower left-hand corner of Figure 1 where the passageway 93 traverses the impeller casing portion 14 at the cavity 93a (Figures 1, 2 and 3). The fluid enters the bottom of the impeller cavity 83 from the cavity 93a it is engaged by the impeller blades 88 and is thrust obliquely backward into the plane of the paper (Figure 1) and passes into the middle casing portion 15 through the opening or port 92h (Figure 4). The fluid passes obliquely through that portion of the passageway 93 within the middle casing portion 15 and emerges through the opening 93f (top of Figure 6 and Figure 1) into the runner chamber 121. The fluid entering through the opening 93f, which acts as a nozzle, engages the runner buckets 114. As these are inclined to the periphery of the runner 18 (Figure 7) rotation is imparted to the latter. The liquid, having imparted its force to the runner 18, re-enters the middle casing portion 15 through the opening or port 93e and passes through the portion of the passageway or chamber 93 contained therein, this being located in front of the plane of the paper in Figure 1. The fluid leaves the middle casing portion 15 through the opening 93d and re-enters the middle casing portion through the opening 93c. The fluid passes through the portion of the passageway 93b contained within the impeller casing 14 and moves into the cavity 93a, to the left of the impeller 17, completing the circuit. Thus the fluid traverses an annular path extending behind the impeller at the left-hand side of Figure 1 and circles around at an oblique angle to the axis of the shaft 28 within the casing portions 14 and 15 into the buckets 114 of the runner 18.

The two remaining passageways or chambers 91 and 92 containing the fluid bodies 95 and 96 are similarly described as to the operation of the machine except that they are displaced 120 degrees circumferentially away from the passageway or chamber 93 containing the rotating annular fluid body 97. The fluid also rotates in a clockwise direction, looking from the left-hand end of Figure 1 toward the right-hand end, which is the direction indicated by the arrows in Figures 4 and 8. Since the chambers or passageways 91 and 92 intersect the impeller chamber 93 and runner chamber 121 out of the plane of the paper of the drawing in Figure 1, the course of the fluid is not as easily traced. In view of the detailed description of the path of the fluid in the passageway 93, however, a repetition of the detailed description is not believed to be necessary.

As regards the flow of the fluid in the body 95 within the passageway or chamber 91, the fluid, rotating in a clockwise direction as before, enters the impeller chamber 83 from the cavity 91a, due to the suction created therein by the rotation of the impeller 17. The fluid passes downward in front of the plane of the paper in Figure 1 and after having rotation imparted to it by the impeller vanes 88, passes outward from the impeller casing 14 through the port 91f in the lower part of Figure 1 into the passageway 81e in the middle casing portion, thence outward through the opening 91g (Figure 6) into the bucket cavity 114 of the bucket in the runner 18 which happens to be passing this opening at that instant. The fluid imparts its force to the buckets, causing the continued rotation of the runner 18, and re-enters the middle casing portion 15 through the port 91h (Figure 6) where it passes upwardly and emerges through the opening 91d into the cavity portion 91b, whence it passes through the opening 91c into the cavity 91a in the impeller casing portion 14, re-entering the suction or intake side of the impeller 17 and completing the circuit.

The course of the fluid body 96 in the passageway 92 does not show well in Figure 1, because most of the ports or openings lie outside the plane of the drawing, either in front of it or behind it. The fluid enters the impeller cavity 83 from the cavity 92a (Figure 3) and has rotation imparted to it by the blades 88 of the impeller 17. The fluid leaves the impeller cavity through the opening 92h (Figure 4), passes through the middle casing portion 15 and emerges at the opening 92g (Figure 6), entering the buckets 114 of the runner 18. After imparting a rotatory thrust to the runner 18 in this manner, the fluid leaves the bucket cavities 114 through the opening 92f and passes upward obliquely through the casing portion 15, emerging into the chamber portion 92b (Figure 4) at the forward or left-hand side of the middle casing portion 15. From the chamber portion 92b, the fluid passes through the adjacent openings 92d and 92c into the cavity 92a in the impeller casing portion 14 (Figure 3). The fluid passes through the impeller casing cavity 92a behind the impeller 17 and re-enters the impeller chamber 83 on the suction side of the impeller 17, completing the circuit.

The rotation of the runner 18 in this manner imparts rotation to the sleeve 39 journaled on the shaft 28 (Figure 1). Depending upon the position of the output clutch 12, the sleeve or hollow shaft 39 either drives the shaft directly or through the back gearing 70, 71 in a reverse direction so that the vehicle is propelled either forward or backward. Assuming that the shifting clutch member 50 is shifted to the left (Figure 1) so that the internal teeth 51 engage the external teeth 48, 49, the drive is transmitted directly from the hollow runner shaft 39 through the upper clutch 12 to the propeller or output shaft 28, driving the vehicle forward. If, however, the clutch member 50 is shifted to the right in Figure 1 so that the sliding gear 57 meshes with the idler gear 72 (Figures 1 and 18), then the drive is transmitted from the hollow runner shaft 39 through the intermeshing gears 47 and 70 to the hub or hollow shaft 68 to the pinion 71 on the opposite end thereof. From the pinion 71, the drive is transmitted through the intermeshing idler gear 72 to the sliding gear 57, now meshing with the idler gear 72, and thence to the propeller shaft 28 through the spline 60, causing the vehicle to be propelled in a reverse or backing direction.

As the vehicle comes up to speed from a standing stop, it reaches the point where the drive may be shifted to direct drive from the engine shaft 19 to the output or propeller shaft 28. This is accomplished by shifting the input clutch 11 to the left from its neutral position of Figure 1, causing the internal teeth 29 to mesh with the teeth 30, 31 and directly drive the output shaft 28.

To maintain the interior of the casing 13 filled with the working fluid such as oil, a conventional filling pump (not shown) is mounted in the forward casing extension 22 which serves as an oil reservoir. A conventional overflow or relief valve (not shown) to take off the air within the casing 13 is also mounted at the top of the casing near the flange 79 in order to remove air pockets. This arrangement is well-known among hydraulic transmission engineers.

What I claim is:

1. A hydraulic torque converter comprising a casing having therein an impeller chamber, a runner chamber, an impeller having fluid-moving elements thereon rotatably mounted in said impeller chamber, a runner having fluid-moved elements thereon rotatably mounted in said runner chamber upon the same axis of rotation as said impeller, a driving member operatively connected to said impeller, a driven member operatively connected to said runner, a fluid reactor disposed between said impeller and said runner, and a sectional fluid conduit of substantially toroidal shape extending around the axis of rotation of one of said members and through said reactor and hydraulically interconnecting said chambers, separate sections of said conduit being disposed in said impeller, in said reactor and in said runner respectively.

2. A hydraulic torque converter comprising a casing having therein an impeller chamber, a runner chamber, an impeller having fluid-moving elements thereon rotatably mounted in said impeller chamber, a runner having fluid-moved elements thereon rotatably mounted in said runner chamber upon the same axis of rotation as said impeller, a driving member operatively connected to said impeller, a driven member operatively connected to said runner, a fluid reactor disposed between said impeller and said runner, and a sectional fluid conduit of substantially toroidal shape extending around the axis of rotation of one of said members and through said reactor and hydraulically interconnecting said chambers, separate sections of said conduit being disposed in said impeller, in said reactor and in said runner respectively, said conduit having its center line disposed approximately in a plane inclined obliquely relatively to the axis of rotation of said driving member.

3. A hydraulic torque converter comprising a casing having therein an impeller chamber, a runner chamber, an impeller having fluid-moving elements thereon rotatably mounted in said impeller chamber, a runner having fluid-moved elements thereon rotatably mounted in said runner chamber upon the same axis of rotation as said impeller, a driving member operatively connected to said impeller, a driven member operatively connected to said runner, a fluid reactor disposed between said impeller and said runner, and a sectional fluid conduit of substantially toroidal shape extending around the axis of rotation of one of said members and through said reactor and hydraulically interconnecting said chambers, separate sections of said conduit being disposed in said impeller, in said reactor and in said runner respectively, said conduit having its center line disposed approximately in a plane inclined obliquely relatively to the axis of rotation of said driving member at a compound angle.

4. A hydraulic torque converter comprising a casing having therein an impeller chamber, a runner chamber, an impeller having fluid-moving elements thereon rotatably mounted in said impeller chamber upon the same axis of rotation as said impeller, a runner having fluid-moved elements thereon rotatably mounted in said runner chamber, a driving member operatively connected to said impeller, a driven member operatively connected to said runner, a fluid reactor disposed between said impeller and said runner, and a sectional fluid conduit of substantially toroidal shape extending around the axis of rotation of one of said members and through said reactor and hydraulically interconnecting said chambers, separate sections of said conduit being disposed in said impeller, in said reactor and in said runner respectively, said runner elements comprising cup-shaped bucket cavities positioned on said runner.

5. A hydraulic torque converter comprising a casing having therein an impeller chamber, a runner chamber, an impeller having fluid-moving elements thereon rotatably mounted in said impeller chamber, a runner having fluid-moved elements thereon rotatably mounted in said runner chamber upon the same axis of rotation as said impeller, a driving member operatively connected to said impeller, a driven member operatively connected to said runner, a fluid reactor disposed between said impeller and said runner, and a sectional fluid conduit of substantially toroidal shape extending around the axis of rotation of one of said members and through said reactor and hydraulically interconnecting said chambers, separate sections of said conduit being disposed in said impeller, in said reactor and in said runner respectively, said runner elements comprising cup-shaped bucket cavities positioned on said runner obliquely to the axis of rotation thereof.

6. A hydraulic torque converter comprising a casing having therein an impeller chamber, a runner chamber, an impeller having fluid-moving elements thereon rotatably mounted in said impeller chamber, a runner having fluid-moved elements thereon rotatably mounted in said runner chamber upon the same axis of rotation as said impeller, a driving member operatively connected to said impeller, a driven member operatively connected to said runner, a fluid reactor disposed between said impeller and said runner, and a plurality of interentwined sectional fluid conduits of substantially toroidal shapes extending around the axis of rotation of one of said members and through said reactor and hydraulically interconnecting said chambers at spaced locations therein, separate sections of said conduit being disposed in said impeller, in said reactor, and in said runner respectively.

7. A hydraulic torque converter comprising a casing having therein an impeller chamber, a runner chamber, an impeller having fluid-moving elements thereon rotatably mounted in said impeller chamber, a runner having fluid-moved elements thereon rotatably mounted in said runner chamber upon the same axis of rotation as said impeller, a driving member operatively connected to said impeller, a driven member operatively connected to said runner, a fluid reactor disposed between said impeller and said runner, and a plurality of interentwined sectional fluid conduits of substantially toroidal shapes extending around the axis of rotation of one of said members and through said reactor and hydraulically interconnecting said chambers at spaced locations therein, separate sections of said conduit being disposed in said impeller, in said reactor, and in said runner respectively, said conduits being substantially independent of one another.

8. A hydraulic torque converter comprising a casing having therein an impeller chamber, a runner chamber, an impeller having fluid-moving elements thereon rotatably mounted in said impeller chamber, a runner having fluid-moved elements thereon rotatably mounted in said runner chamber upon the same axis of rotation as said impeller, a driving member operatively connected to said impeller, a driven member operatively connected to said runner, a fluid reactor disposed between said impeller and said runner, and a plurality of interentwined sectional fluid conduits of substantially toroidal shapes extending around the axis of rotation of one of said members and through said reactor and hydraulically interconnecting said chambers at spaced locations therein, separate sections of said conduit being disposed in said impeller, in said reactor, and in said runner respectively, each of said conduits having its center line disposed approximately in a plane directed obliquely to the axis of rotation of said driving member.

9. A hydraulic torque converter comprising a casing having therein an impeller chamber, a runner chamber, an impeller having fluid-moving elements thereon rotatably mounted in said impeller chamber upon the same axis of rotation as said impeller, a runner having fluid-moved elements thereon rotatably mounted in said runner chamber, a driving member operatively connected to said impeller, a driven member operatively connected to said runner, a fluid reactor disposed between said impeller and said runner, and a plurality of interentwined sectional fluid conduits of substantially toroidal shapes extending around the axis of rotation of one of said members and through said reactor and hydraulically interconnecting said chambers at spaced locations therein, separate sections of said conduit being disposed in said impeller, in said reactor, and in said runner respectively, each of said conduits having its center line disposed approximately in a plane directed obliquely to the axis of rotation of said driving member, said conduits being substantially independent of one another.

10. A hydraulic torque converter comprising a casing having therein an impeller chamber, a runner chamber, an impeller having fluid-moving elements thereon rotatably mounted in said impeller chamber, a runner having fluid-moved elements thereon rotatably mounted in said runner chamber upon the same axis of rotation as said impeller, a driving member operatively connected to said impeller, a driven member operatively connected to said runner, a fluid reactor disposed between said impeller and said runner, and a sectional fluid conduit of substantially toroidal shape extending around the axis of rotation of one of said members and through said reactor and hydraulically interconnecting said chambers, separate sections of said conduit being disposed in said impeller, in said reactor and in said runner respectively, said conduit having its center line disposed approximately in a plane inclined obliquely relatively to the axis of rotation of said driving member and extending behind said impeller into the suction side thereof.

11. A hydraulic torque converter comprising a casing having therein an impeller chamber, a runner chamber, an impeller having fluid-moving elements thereon rotatably mounted in said impeller chamber, a runner having fluid-moved elements thereon rotatably mounted in said runner chamber upon the same axis of rotation as said impeller, a driving member operatively connected to said impeller, a driven member operatively connected to said runner, a fluid reactor disposed between said impeller and said runner, and a plurality of interentwined sectional fluid conduits of substantially toroidal shapes extending around the axis of rotation of one of said members and through said reactor and hydraulically interconnecting said chambers at spaced locations therein, separate sections of said conduit being disposed in said impeller, in said reactor, and in said runner respectively, each of said conduits having its center line disposed approximately in a plane directed obliquely to the axis of rotation of said driving member and extending behind said impeller into the suction side thereof.

WERNER H. FENGLER.

REFERENCES CITED

The following references are of record in the file of this patent:

UNITED STATES PATENTS

| Number | Name | Date |
|---|---|---|
| 1,141,812 | Michell et al. | June 1, 1915 |
| 1,888,881 | Murphy | Nov. 22, 1932 |
| 2,015,212 | Beaumont | Sept. 24, 1935 |
| 2,088,818 | Skinner | Aug. 3, 1937 |

FOREIGN PATENTS

| Number | Country | Date |
|---|---|---|
| 305,996 | Italy | Feb. 22, 1933 |